March 23, 1965  B. MISHELEVICH  3,175,082
RAILWAY CAR RETARDER SPEED CONTROL APPARATUS
Filed March 14, 1955  5 Sheets-Sheet 1

Fig.1.

INVENTOR.
Benjamin Mishelevich.
BY  W. L. Stout
HIS ATTORNEY

March 23, 1965   B. MISHELEVICH   3,175,082
RAILWAY CAR RETARDER SPEED CONTROL APPARATUS
Filed March 14, 1955   5 Sheets-Sheet 5

Fig. 2d.

INVENTOR.
Benjamin Mishelevich.
BY   W. L. Stout
HIS ATTORNEY 3,175,082
RAILWAY CAR RETARDER SPEED CONTROL APPARATUS
Benjamin Mishelevich, Pittsburgh, Pa., assignor to Westinghouse Air Brake Company, Wilmerding, Pa., a corporation of Pennsylvania
Filed Mar. 14, 1955, Ser. No. 493,902
3 Claims. (Cl. 246—182)

My invention relates to railway car retarder speed control apparatus, and more particularly to means for automatically controlling master and intermediate retarders of gravity-type classification yards according to the weight and rolling conditions of cars or multiple car cuts.

A railway gravity-type classification yard is one in which a single track leading from a hump diverges into a relatively large number of classification tracks. The track is formed with a descending grade and a car cut which may consist of a single car or several cars coupled together moves from the crest of the hump under the action of gravity to a classification track into which it is to be classified. The speed a car cut may attain in moving from the crest of the hump to its final classification track depends among other things upon the weight of each car and its contents and upon rolling or switching conditions. There is a correct speed at which a car cut should drift into its selected classification track in order for it to couple to cars already standing on that track without too great an impact. The speed of the car cuts are controlled by car retarders located at selected points in the tracks leading from the crest of the hump to the classification tracks. In most yards retarders are located in the track between the crest of the hump and the first or hump track switch and also in the lead tracks between the first switch and the different groups of classification tracks. It is customary to refer to the retarders located in the hump track as master retarders and to the retarders located in the track beyond the hump track switch as intermediate retarders. Other retarders are provided still nearer to the individual classification tracks, and these last mentioned retarders are generally referred to as group retarders. In the description and claims of the current application the retarders will be referred to as master, intermediate, and group retarders according to the present practice. Each retarder may comprise one, two, or more sections placed end to end as the situation requires, each section being independently operated and controlled.

Obviously, the braking force that a retarder exerts must be varied according to the car weight since it is desirable that cars of different weights leave the retarders at different speeds. Accordingly, a retarder is equipped with control means by which the retarder can be set to exert two, three, four, or even five different braking forces as well as being set at a release or open position where it exerts no braking force.

In many prior classification yard installations, the braking force of each retarder is electrically controlled by a control lever which is manually operable to a different position for each of the different braking conditions. These control levers, one for each retarder section, are grouped on a control panel mounted in a control tower located where an operator can observe the car cuts and set up different braking forces for the different retarder sections as he deems necessary to obtain the desired speed for the cut. Cuts are usually humped at the rate of one every 15 seconds or less and there may be several car cuts moving between the hump and classification tracks simultaneously. Consequently, an operator has little time to observe each car cut and check the factors that affect its speed. Hence, in manual control of the retarders a high degree of skill, judgment, and perception are required on the part of the operator in order to obtain satisfactory switching. Also, it follows that the number of retarders a single operator can control properly is limited and several control towers each with an operator are needed in large yards.

To lessen the burden of the operators and improve the switching operation, speed control means have been installed for each retarder in some yards. This speed control means repeatedly measures the speed of a car passing through a retarder and automatically controls the braking force of the retarder in such a manner that the car is gradually slowed down or allowed to speed up so that it arrives at the exit end of the retarder at the desired leaving speed without the car having travelled any appreciable portion of the retarder at the leaving speed.

As a further aid in improving the switching operations at a hump yard, car weight determining means have been installed at some installations and the braking force of selected ones of the retarders automatically controlled according to the weight of a car and its contents. These weight determining means includes a weighing device located in the track in the approach to the retarders and operable to register the weight of each pair of wheels and axle of a car cut. In practice, the car weights are grouped into light, medium, and heavy groups and the weighing device registers the car weight group into which each car falls. The registered weight is stored in weight information storage means which is operable to a different position or conditions for each car weight group, that is, light, medium, or heavy. While it is here considered that three weight groups are used, it is apparent that a larger number or a fewer number of car weight groups can be used.

The weight information stored for a car cut is employed to determine the initial braking force of the retarder and the partial braking force to which the retarder is reduced as the car speed is measured by the speed measuring means approaches the leaving speed which has previously been selected for the weight group in which that particular car cut is classified. Also the retarder is released when the car cut is moving at the desired leaving speed.

Prior to my present invention, this automatic control of retarders according to the weight of a car cut has been provided for master retarders only and not applied to intermediate and group retarders.

Accordingly, an object of my invention is the provision of novel and improved means for automatic control of intermediate and group retarders of a classification yard according to car weight.

Again, in classification yards the track switches are generally power operated. In many installations each track switch is controlled by a lever operable to a normal or a reverse position according as the switch is to be moved to its normal or reverse position. These switch levers one for each track switch of the yard are grouped in a control machine or panel located in a control tower. An operator, who is provided with the information as to the classification track into which each car cut is to be classified, sets up the required route that each car cut must take to its final classification track by properly positioning the levers of the switches involved in the route. Where a number of car cuts are moving toward their different classification tracks simultaneously, proper operation of the track switches in order for each car cut to be properly routed becomes difficult. Automatic control systems of the track switches of classification yards have been developed. These automatic switching systems greatly facilitate the routing of car cuts and improve the operation of a yard and increase its capacity. In these automatic switching systems, the track switches of the entire route of a car cut to its final classification track are controlled by a single lever or push button of a control machine in a control tower. Also the routes of several car cuts can be stored in the apparatus and the individual routes automatically set up as the cuts follow each other. One such automatic switching system is disclosed and claimed in my copending application for Letters Patent of the United States Serial No. 355,281, filed May 15, 1953, for Automatic Control of Railway Classification Yard Track Switches, now Patent No. 2,863,991 issued December 9, 1958. In this patent, the route description of a car cut is entered in the apparatus by the operation of a push button which designates the final classification track into which that car cut is to be switched. That is, each classification track of the yard is represented by an individual push button on the control machine in the control tower. Operation of a push button causes the apparatus to automatically control the track switches to set up the route to that classificaion track. The apparatus is capable of storing the route descriptions of several car cuts and the routes are set up as the cuts follow each other, each track switch when cleared by one cut being set as required for the route of the next following car cut.

A further object of my present invention is the provision of novel means for coordinating car weight determining means with automatic switching apparatus for automatic control of intermediate and group retarders of a gravity-type classification yard according to the car weight and rolling conditions.

Another object of my invention is the provision of novel means for transferring the car weight information stored for a car cut at a weighing device to the control apparatus of an intermediate or group retarder.

A further object of my invention is the provision of means for transferring the car weight information stored for control of a master retarder to the control apparatus of a retarder spaced between the master retarder and a classification track of a yard by utilizing the apparatus of an automatic switching system provided for the yard whereby the additional equipment required to store car weight information for control of an intermediate or group retarder is minimized and an economical system obtained.

Other objects, features and advantages of apparatus embodying my invention will appear as the specification progresses.

In practicing my present invention, I utilize apparatus of a car weight determining means, apparatus of an automatic switching system, and special weight information storage relays and coordinating circuits. Preferably the car weight determining means is similar to that disclosed and claimed in a copending application for Letters Patent of the United States Serial No. 473,819, filed December 8, 1954 by E. C. Falkowski for Car Retarder Speed Control Apparatus, now Patent No. 2,819,682, issued January 14, 1958. This Falkowski patent and the present application are of common ownership and reference is made to the Falkowski patent for a full description of the apparatus of a car weight determining means of the type here contemplated so that it is necessary in the present application to disclose and describe the car weight determining means only as needed for a full understanding of my invention.

The car weight determining means includes a weighing device and a weight information storage relay means. The weighing device has an operating element located in the track and is operable to register the weight of each pair of wheels and axle of a car cut as being of light, medium or heavy weight. This registered weight is stored in a weight information storage relay group, the relays being energizable in a different arrangement or combination for each car weight group. Three weight groups are here considered as being provided, but it is clear that a greater or lesser number of weight groups can be used.

This stored weight information is here considered as being first used to control the braking force exerted by each section of the master retarder, in cooperation with car speed measuring means associated with each master retarder section, to obtain a desired speed at which the car cut leaves the master retarder, this desired speed being preselected and different for each car weight group.

The weighing device is biased to reset when a pair of car wheels has passed the track element. Occupancy relays are provided to retain the stored weight information while the car cut is passing through the various sections of the master retarder. These occupancy relays release the weight storage relay means for each section of the master retarder when the cut vacates the corresponding section, at which time the weight information for a second and following car cut can be stored. End-of-cut relays are provided to permit modification of stored weight information in accordance with the weight of various cars in a particular cut and when they become energized to indicate an end of a cut, the stored weight cannot be modified further.

Prior to the release of the weight storage relays at the weighing device, the stored weight information for a car cut is transferred to other weight storage relays provided for the intermediate and group retarders through which that car cut must pass in its route to its final classification track. This transfer of the car weight information for a car cut from the initial weight storage relays at the weighing device to weigh storage relays for the intermediate and group retarders located in the route of this particular car cut is effected through relays controlled by the automatic switching apparatus.

Preferably the automatic switching apparatus is similar to that disclosed in my aforementioned Patent No. 2,863,-991. Reference is made to that patent for a full description of the automatic switching apparatus herein contemplated and only the portion of the automatic switching apparatus needed for a full understanding of my present invention will be described.

In this automatic switching apparatus there are provided route storage units, one unit for each track switch location in the yard. Each route storage unit is subdivided into relay storage banks. The initial unit, that is, the unit for the first or hump track switch, is provided with as many different banks as there are route descriptions to be stored at any one time. For example, if five different route descriptions are to be stored at any one time, the initial unit has five storage banks. A route description is stored in the initial unit in digital form by providing a digital relay for each storage track. In the other route storage units, a route description is stored in a combination form by switch storage relays. That is, each of these route storage units is provided with as many switch storage relays as the maximum number of track switches that can be transversed by a car cut after passing that switch location. Each storage bank includes three relays different as to their function; first, storage detector or destination relays which by being energized indicate that a route description is stored in the associated bank; second, switch storage relays which designate the route the approaching car cut is to take; and third, storage transfer relays which determine when a route description may be transferred from one storage bank to the next successive bank.

Prior to the weighing of a car cut or at least prior to the cut entering the master retarder, the route description of the car cut is stored in the automatic switching apparatus by the route operator pressing the control machine push button which designates the final classification track of this car cut.

Operation of a push button of the control machine enters the corresponding route description in the initial storage unit by selection of the corresponding digital relay of the first bank of the unit.

This route description entered in the initial unit is cascaded from the first storage bank through the subsequent storage banks to the last bank providing the intermediate banks are empty. That is, a route description entered in the initial unit is stored in the last empty bank of the unit. For example, when five storage banks are provided in the initial storage unit, five route descriptions can be entered, the first description entered being stored in the fifth bank, the second description being stored in the fourth bank, and so on until the fifth description is stored in the first bank.

The forwarding of a route description from one storage unit to the next is effected upon the occupancy of a detector track section associated with the switch location from which the route description is being forwarded. At the intitial unit this operation is governed by a storage transfer repeater stick relay and a storage destination or detector repeater stick relay. These relays are governed by the track relay of the associated detector track circuit in such a manner that these stick relays function to forward a route description from the final bank of the initial storage unit to the first bank of the succeeding storage unit. The operation of a track switch is controlled over contacts of associated switch storage relays provided in the storage unit, the arrangement being such that the track switch is operated to its normal position or its reverse position according to the energized condition of the switch storage relays.

The special relays and circuits provided according to my invention include a weight information storage unit for each route description storage unit except the initial route storage unit. Each of these weight information storage units includes two banks to correspond to the two banks of the associated route storage unit. Each weight information storage unit is controlled by the route storage units to forward the stored weight information when the route description is forwarded from one route storage unit to the next. Also, the weight storage unit for each route storage unit for a track switch associated with an intermediate or group retarder is provided with a weight information storage relay group which is energizable in a different arrangement or combination for each car weight group. In general, a weight information storage unit is controlled by the storage banks of the route storage unit of the automatic switching means for the switch location next in the approach of an intermediate retarder, and also by the route storage unit at the switch location next toward the final classification track beyond the intermediate retarder. The weight information storage relays of a weight storage unit are used to control the braking force exerted by the associated retarder and, in cooperation with an associated car speed measuring means, thereby obtain a leaving speed preselected according to the different car weight groups.

I shall describe one form of apparatus embodying my invention and shall then point out the novel features thereof in claims.

In the accompanying drawings.

In the several views like reference characters are used to designate similar parts.

Figure 1:
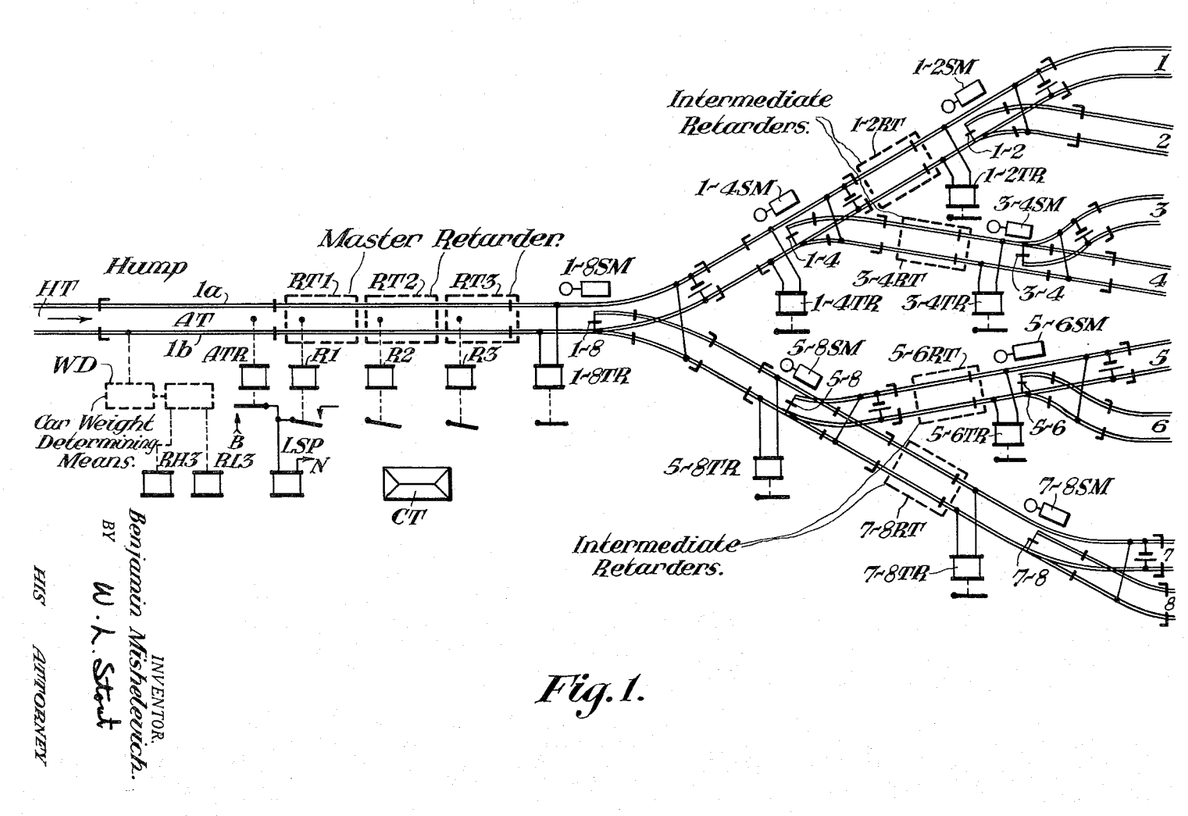
FIG. 1 is a diagrammatic view showing a gravity-type classification yard having intermediate retarders for the control of which retarders the apparatus embodying my invention is provided.

Referring to FIG. 1, there is shown diagrammatically the track layout of a gravity-type or hump yard, only as many of the tracks as necessary for an understanding of my invention being shown for simplicity. The reference characters 1a and 1b designate the track rails of a track HT leading from the crest of a hump at the extreme left-hand end of the drawing with a descending grade for railway cars to move to the right under the force of gravity. This hump track HT diverges into lead tracks extending to classification tracks at the right-hand end of the drawing. For simplicity, I shall assume that there are eight classification tracks numbered 1 to 8, inclusive. Oviously, these eight tracks shown in FIG. 1 may further diverge into a much larger number of classification tracks and a particular yard at which my invention is practiced includes a total of eighty classification tracks. It is clear the number of classification tracks can be made to suit the local conditions.

In FIG. 1, the hump track diverges to the eight classification tracks through seven track switches which are identified by a hyphenated number combination made up of the numbers of the classification tracks to which the switch directs traffic. For example, the first or hump track switch 1–8 leads to all of the classification tracks, the switch 1–4 directs traffic to tracks 1 to 4, inclusive, and the switch 1–2 directs traffic to tracks 1 and 2.

Each track switch is provided with a power operated switch movement SM preceded by the hyphenated number combination of the switch to which the movement is connected. These switch movements are illustrated by the standard symbol used in the art to identify a switch movement. These movements may be of any suitable form, there being several well-known structures. They can be, for example, of the direct acting electro-pneumatic type similar to that disclosed and described in detail in Letters Patent of the United States No. 2,092,828, granted to Herbert L. Bone on September 14, 1937, for Railway Switch Operating Apparatus. It is sufficient to explain here that each switch movement is operable to move the associated track switch to its normal or reverse position according to the manner a switch controlling relay means is energized. It will be considered that, in the drawing, the normal position of each track switch diverts traffic to the left and the reverse position diverts traffic to the right when looking from the hump track toward the classification tracks.

Each of the switch locations is provided with a detector track circuit of a suitable type and here shown as a conventional insulated track section having a track circuit including a track battery connected across the rails at one end of the track section and a track relay connected across the rails at the other end of the section. These track relays are identified by the reference character TR preceded by the hyphenated number combination of the associated switch, as, for example, track relay 1–8TR. These track circuits will be apparent from an inspection of FIG. 1. Each provides detector locking for the associated track switch, the arrangement being such that, according to the usual practice, the switch machine is locked and the switch cannot be operated so long as any pair of wheels of a car cut occupies the detector section. It is to be understood that various other known detector track circuit arrangements can be employed. It is to be noted that the track rails between the various track switches are not here included in track circuits but may be provided with track circuits if desired.

The hump track between the crest and the first track switch 1–8 is provided with a master car retarder comprising three independently operated sections RT1, RT2 and RT3 which are shown conventionally by dotted rectangles since these retarder sections may be any one of the different known constructions for retarders. For example, these retarder sections may be similar to the electropneumatic retarder disclosed and described in detail in Letters Patent of the United States No. 1,927,201, granted September 19, 1933 to Herbert L. Bone, for Railway Braking Apparatus. The master retarder is shown with three sections but obviously it can comprise one, two or more than three sections, as required.

Preferably the hump track in the approach to the master retarder is formed with an approach track section AT having a track circuit including a track relay ATR.

Also the retarder sections RT1, RT2 and RT3 are provided with occupancy relays R1, R2 and R3, respectively. Each of these occupancy relays has connections wherewith it is normally deenergized and is energized and picked up so long as the associated retarder section is ocupied by a pair of car wheels and axle, such occupancy relay connections being known to the art.

The switch movements SM are controlled from a central control tower CT which is generally located near the hump, the arrangement being such that the track switches can be set to route a car cut from the hump track to any one of the classification tracks from a control machine in the control tower. This automatic switching arrangement will be more fully explained later in connection with FIGS. 2a, 2b, 2c and 2d.

Four intermediate retarders are provided in the tracks leading from the hump track switch 1–8 to the several classification tracks. For example, intermediate retarder 1–2RT is located in the approach to the switch 1–2 which directs traffic to classification tracks 1 and 2, intermediate retarder 3–4RT is located in the approach to switch 3–4 which directs traffic to tracks 3 and 4, intermediate retarder 5–6RT is located in the approach to switch 5–6 which directs traffic to tracks 5 and 6, and intermediate retarder 7–8RT is located in the approach to switch 7–8 which directs traffic to tracks 7 and 8. Each of these intermediate retarders comprises a single section but may be formed with two or more sections if required. These intermediate retarders are preferably of the same type as the master retarder sections and will be assumed as being of the electropneumatic type. The intermediate retarders are illustrated conventionally by dotted rectangles because their specific structure is not a part of my present invention. It is to be noted, as will be explained more fully hereinafter, that each retarder is capable of exerting several different degrees of braking force according to the manner in which current is supplied to the control elements of the retarder, and that each retarder is equipped with car speed measuring means and an occupancy relay.

Again, the yard of FIG. 1 is provided with a car weight determining means including a weighing device WD and weight information storage relay groups. Only the one group comprising relays RH3 and RL3 is shown in FIG. 1 since the weight determining means will be described further in connection with FIGS. 2a, 2b, 2c and 2d.

It is to be pointed out that suitable sources of electric power are provided, these sources being of proper voltage and current capacity and located about the yard as needed. These sources are not shown in order to not unduly complicate the drawings. In accordance with common practice, one terminal, usually the positive terminal of each source, is identified by the reference character B and the other, or negative terminal, is identified by the reference character N.

In referring to FIGS. 2a, 2b, 2c and 2d, the weight determining means and the automatic switching apparatus will be described and then the apparatus for transferring the car weight information from the weight determining means to the apparatus for control of the intermediate retarders will be taken up.

Figure 2A:
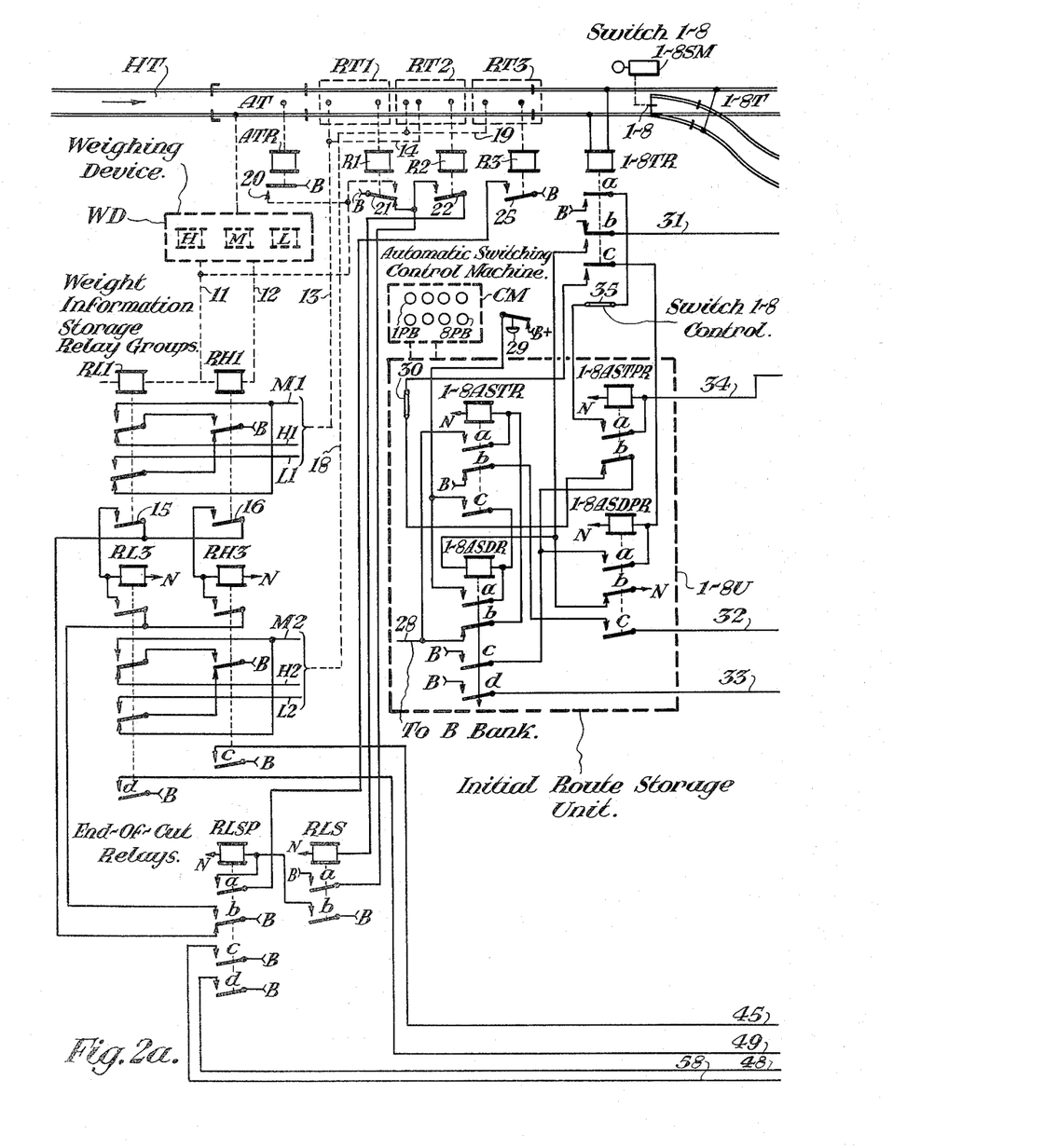
FIGS. 2a, 2b, 2c and 2d, when placed side by side in the order named with FIG. 2a at the left, are diagrammatic views showing a preferred form of apparatus and circuits embodying my invention when coordinated with car weight determining means and automatic switching apparatus for the yard of FIG. 1.

Looking at FIG. 2a, the weight determining means is similar to that disclosed and claimed in the aforementioned E. C. Falkowski Patent 2,819,682 and will be described but briefly. The weighing device WD has an operating element which is located in the track, preferably in the approach track section AT. The device WD is responsive to each pair of car wheels and axle to operate weight registering relays according to the weight of the car and its contents. The car weights are grouped into light, medium and heavy, and there are three registering relays L, M and H which register the light, medium and heavy car weight groups, respectively. These registering relays control two groups of weight information storage relays, a first group including relays RL1 and RH1, and a second group including relays RL3 and RH3. The relays RL1 and RH1 have connections which are controlled by the registering relays to energize the storage relays in a different combination for each car weight group, these connections being indicated by dotted lines 11 and 12. The arrangement is such that the storage relays are normally deenergized; relay RL1 alone is energized for a light weight car, both relays RL1 and RH1 are energized for a medium weight car, and relay RH1 alone is energized for a heavy weight car. These relays RL1 and RH1 complete circuits including wires M1, H1 and L1 for control of the retarder sections RT1 and RT2, the connections to the retarders being indicated by dotted lines 13 and 14.

The weight information stored in the first group RL1–RH1 is cascaded to the second group RL3–RH3 by circuits completed at front contacts 15 and 16 of relays RL1 and RH1, respectively, and back contact b of an end-of-cut relay RLSP to be referred to shortly. Thus the weight combination effected in the first storage group is repeated in the second group if relay RLSP is released. The second group of relays RL3–RH3 complete circuits over wires M2, H2 and L2 for control of retarder sections RT2 and RT3, the connections being indicated by dotted lines 18 and 19. As explained in the Falkowski patent previously cited, the control of the second retarder section RT2 is first effected by the first storage group RL1–RH1 and then transferred to the second group RL3–RH3 by the end-of-cut relays RLS and RLSP when a car cut passes out of the first retarder section RT1. Also, the first group of storage relays RL1–RH1 when once energized according to the weight registered by the weighing device are retained energized by stick circuits completed at back contact 20 of relay ATR or front contact 21 of occupancy relay R1, this storage relay group being reset when the car cut passes out of retarder section RT1. The second storage relay group RL3–RH3 is retained in the energized condition repeated from the first group by stick circuits completed at front contact b of relay RLSP as will be apparent from an inspection of the drawing.

The end-of-cut relay RLS is provided with a pickup circuit completed at front contact 22 of relay R2 and back contact 21 of relay R1, and with a stick circuit completed over its own front contact a and front contact 22 of relay R2. The end-of-cut repeater relay RLSP is energized by a pickup circuit including front contact b of relay RLS and is retained energized by a stick circuit completed over front contact 25 of relay R3 and its own front contact a. Consequently, the weight information stored in the second group of relays RL3–RH3, when a car passes the weighing device, is retained until that car passes out of the retarder section RT3. The storage relays are then reset ready to store the weight information of a following car.

Referring now to FIGS. 2a to 2d, inclusive, the automatic switching apparatus, as stated hereinbefore, is of the form disclosed in my prior Patent 2,863,991 where it is described in detail. It will be described herein only as needed to understand its relationship to apparatus embodying my present invention. The automatic switching apparatus includes a control machine CM and a route storage unit for each track switch location, these units being identified by the letter U preceded by the hyphenated number combination of the switch. The control machine CM is provided with a push button for each classification track. For the yard shown in FIG. 1, the machine CM has eight push buttons 1PB to 8PB, inclusive, for the eight classification tracks 1 to 8, respectively. The storage unit 1–8U for the first switch 1–8 will be referred to as an initial route storage unit. The route description from the hump track to each classification track is entered in the apparatus by operation of the push button corresponding to the classification track. Each route description entered in the control machine is first stored in a storage bank of relays of the initial storage unit 1–8U, and which storage bank includes a storage means for each possible route. The unit 1–8U is provided with several storage banks so that the routes of several car cuts which are to follow each other from the hump can be stored by operating the push buttons for the different routes the car cuts are to take, the push buttons being operated in the order the respective car cuts are to move from the hump. For example, in the apparatus of my Patent 2,863,991, three route descriptions can be stored in the initial storage unit and the unit has three banks C, B and A, and it will be considered that the unit 1–8U has three banks to store three routes. The arrangement is such that, when a route description is entered in the control machine CM, the route description is first stored in the first storage bank C (not shown) of the storage unit 1–8U and then cascaded through the different storage banks to the last empty bank. The final or A bank of unit 1–8U includes a destination or detector relay and a transfer relay which serve to transfer the route description through the different storage banks. The final bank is further provided with a detector repeater stick relay and a transfer repeater stick relay which serve to advance the route description from the A bank of the initial storage unit 1–8U to the first bank of the storage unit for the next track switch involved in the route stored in the A bank of the initial unit. In FIG. 2a of the drawings, the initial storage unit 1–8U is shown conventionally by a dotted rectangle and only its detector relay 1–8ASDR, transfer relay 1–8ASTR, detector repeater stick relay 1–8ASDPR, and transfer repeater stick relay 1–8ASTPR are shown since these relays and the circuits associated therewith are all that are needed to understand the relationship of the switching apparatus of unit 1–8U with the apparatus of my present invention.

As stated hereinbefore, the A bank of the initial unit 1–8U is provided with switch storage relays (not shown) for control of the switch machine 1–8SM for switch 1–8. These switch storage relays serve to control switch 1–8 to its normal or to its reverse position according as switch 1–8 must be set normal or reverse to direct the car cut being classified toward the classification track corresponding to the route description stored in that bank. These relays of the initial unit 1–8U will be further referred to shortly.

For the yard shown in FIG. 1, the automatic switching apparatus includes six route storage units in addition to the initial unit 1–86, one for each of the switch locations 1–4, 1–2, 3–4, 5–8, 5–6 and 7–8. Since the automatic switching apparatus for the half of the yard including tracks 1 to 4 (track switch 1–8 normal) is substantially a duplication of the apparatus required for the half of the yard including tracks 5 to 8 (track switch 1–8 reverse), only the automatic switching apparatus for classification tracks 1 to 4 need to be considered. Furthermore, the automatic switch apparatus for directing traffic to classification tracks 3 and 4 is substantially a duplication of that provided for directing traffic to classification tracks 1 and 2. Consequently the automatic switching apparatus involved in the routing of cars to tracks 1 and 2 is all that need be considered to show the relationship of the automatic switching apparatus with the apparatus for transferring the car weight information from the initial weight storage relays to weight storage relays for the intermediate retarders of the yard. In other words, the relationship of the automatic switching apparatus to weight speed control means for each of the intermediate retarders 3–4RT, 5–6RT and 7–8RT will be a duplication of that for intermediate retarder 1–2RT. Thus a description of the automatic switching apparatus involved in the transfer of car weight information stored in the initial weight storage relays to weight speed control apparatus for intermediate retarder 1–2RT will provide an understanding for the apparatus provided according to my present invention for the transfer of car weight information to weight speed control apparatus for intermediate retarders 3–4RT, 5–6RT and 7–8RT.

Figure 2B:
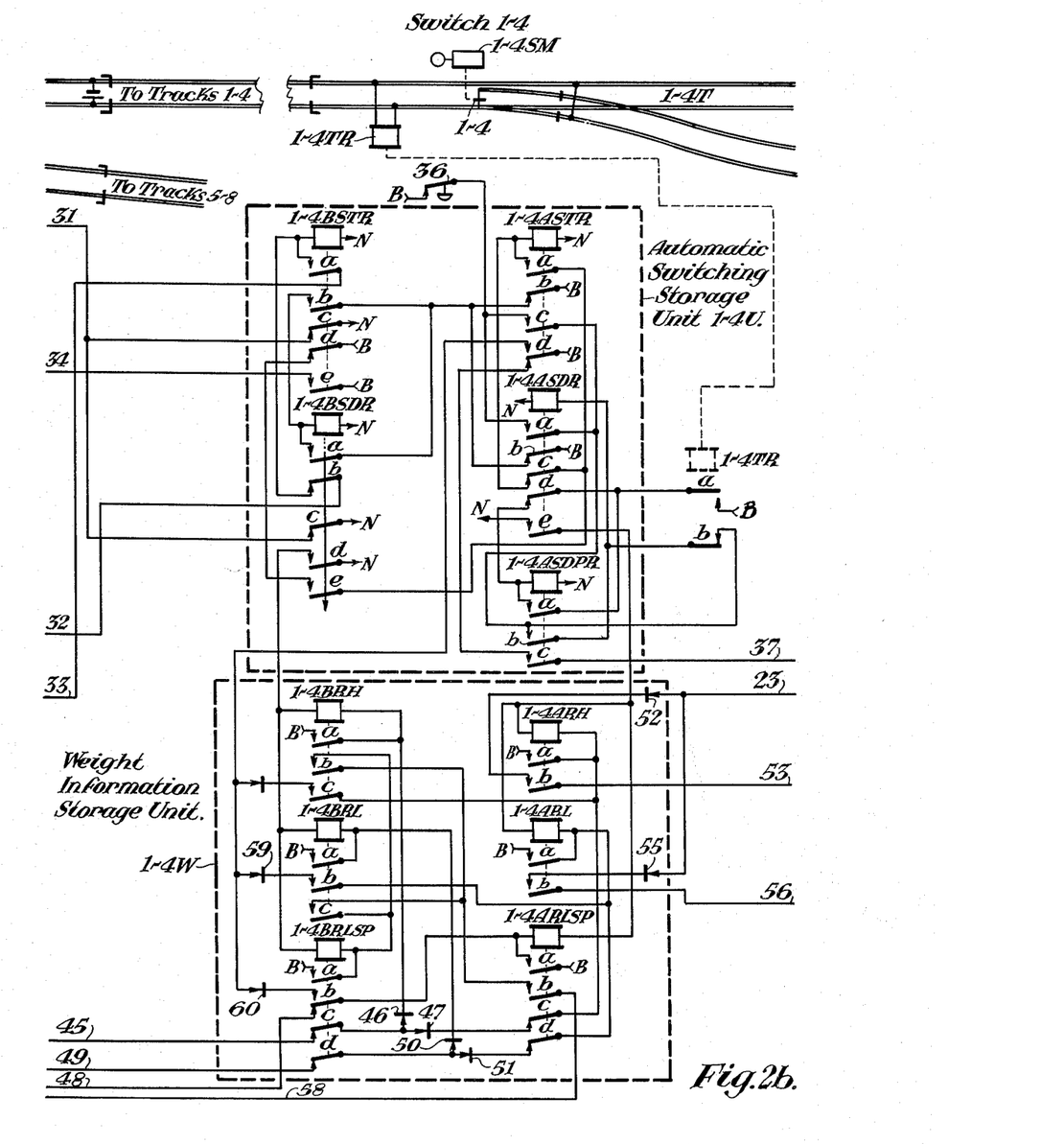

The route storage units for switches 1–4 and 1–2 are indicated as a whole by dotted rectangles 1–4U and 1–2U, respectively. The unit 1–4U includes a storage bank B and a storage bank A, the bank B being provided with a transfer relay 1–4BSTR and a detector relay 1–4BSDR, and the bank A being provided with a transfer relay 1–4ASTR, a detector relay 1–4ASDR, and a detector repeater relay 1–4ASDPR. Similarly the storage unit 1–2U is provided with a B bank having a transfer relay 1–2BSTR and a detector relay 1–2BSDR, and an A bank having a transfer relay 1–2ASTR, a detector relay 1–2ASDR, and a detector repeater relay 1–2ASDPR. As previously explained, in the automatic switching apparatus the route descriptions are stored in the units other than the initial unit 1–8U by a combination code of switch storage relays, and thus the storage units 1–4U and 1–2U are provided with switch storage relays (not shown) which are picked up or released in different combinations depending upon the route stored in the particular unit.

In order to understand the operation of the automatic switching apparatus it will be assumed that with no route description stored in unit 1–8U, the push button 1PB of the control machine CM is depressed momentarily to enter the route description for storage track 1. The route description is initially stored in the first or C bank of unit 1–8U and then cascaded to the final or A bank on the assumption that no other route description has been stored in the unit. At the A bank, current is supplied to the winding of relay 1–8ASTR from the power source over contacts (not shown) of the B bank to wire 28 and thence over back contact b of relay 1–8ASDR and winding of relay 1–8ASTR to terminal N. With relay 1–8ASTR picked up, its front contact a closes a stick circuit for the relay which stick circuit bypasses back contact b of relay 1–8ASDR. The picking up of relay 1–8ASTR establishes a pickup circuit for the detector relay 1–8ASDR, which circuit can be traced from terminal B over a cancellation button 29 included in the switching apparatus, contacts of switch storage relays not shown, front contact c of relay 1–8ASTR, winding of relay 1–8ASDR, and back contact b of repeater relay 1–8ASDPR to terminal N. Relay 1–8ASDR on picking up to close its front contact a establishes a stick circuit which bypasses front contact c of relay 1–8ASTR. With relays 1–8ASTR and 1–8ASDR picked up, a circuit is formed for the switch storage relays (not shown) of the A bank. Since the route to track 1 requires switch 1–8 to be normal, the switch storage relays of the A bank are energized to provide this control of switch 1–8. Also at this time, the B bank is released and energy removed from wire 28 with the result the transfer relay 1–8ASTR is released.

When the car cut routed for track 1 enters track section 1–8T shunting track relay 1–8TR, the route description to track 1 now stored in the A bank of unit 1–8U is forwarded to the first or B bank of the unit 1–4U. It is to be noted that detector relay 1–8ASDR is at this time energized over a first path of its stick circuit which includes back contact b of relay 1–8ASDPR.

Repeater relay 1–8ASDPR is at this time supplied with current from terminal B over front contact c of relay 1–8ASDR, back contact b of relay 1–8ASTPR, a contact 30 closed by the previous banks of unit 1–8U, back contact c of track relay 1–8TR, and winding of relay 1–8ASDPR to terminal N. When relay 1–8ASDPR picks up closing its front contact a, a stick circuit is established through front contact c of relay 1–8ASDR. Hence repeater relay 1–8ASDPR when once picked up is retained energized until the detector relay 1–8ASDR is released due to the storing of the route description in unit 1–4U as will appear shortly. The picking up of repeater relay 1–8ASDPR opens its back contact b and interrupts the previously traced stick circuit path for relay 1–8ASDR, but a second path for this stick circuit is previously established over back contact b of track relay 1–8TR, wire 31, and back contacts c in multiple of relays 1–4BSTR and 1–4BSDR of unit 1–4U to terminal N.

At this time a pickup circuit is completed for relay 1–4BSTR, this circuit extending from terminal B over back contact b of relay 1–8ASTR, front contact c of relay 1–8ASDPR, wire 32, back contact b of relay 1–4BSDR, and winding of relay 1–4BSTR to terminal N, and relay 1–4BSTR picks up. The closing of front contact a of relay 1–4BSTR establishes a stick circuit from terminal B over front contact d of relay 1–8ASDR, wire 33, front contact a and winding of relay 1–4BSTR to terminal N.

With relay 1–4BSTR picked up current is supplied to repeater relay 1–8ASTPR from terminal B over front contact e of relay 1–4BSTR, wire 34, and winding of relay 1–8ASTPR to terminal N. Relay 1–8ASTPR on picking up establishes a stick circuit for itself which includes terminal B, back contact a of track relay 1–8TR, a contact 35 controlled by the apparatus of switch 1–8 and normally closed, front contact a and winding of relay 1–8ASTPR and terminal N.

A circuit is now established for relay 1–4BSDR from terminal B over back contacts b in multiple of relays 1–4ASTR and 1–4ASDR, front contact b of relay 1–4BSTR, and winding of relay 1–4BSDR to terminal N. With relay 1–4BSDR picked up, its front contact a establishes a stick circuit which bypasses front contact b of relay 1–4BSTR.

When relays 1–4BSTR and 1–4BSDR of the B bank of unit 1–4U are picked up, circuits are completed for transferring the route description to the B bank of unit 1–4U. This transferring of the route description is effected through the switch storage relays of the B bank of unit 1–4U. A switch storage relay, as explained in my aforementioned Patent 2,863,991, is picked up when both relays of the B bank are picked up and then is retained energized by a stick circuit which includes a front contact of the detector relay of the B bank, in this case the detector relay 1–4BSDR.

Under these circumstances, the picking up of relay 1–4BSDR opens its back contact c and interrupts the second stick circuit for relay 1–8ASDR so that relay 1–8ASDR releases after a short interval, this relay being provided with slow release characteristics. With front contact c of relay 1–8ASDR open, repeater relay 1–8ASDPR is deenergized and releases. Relay 1–4BSTR is also deenergized at this time due to the opening of its stick circuit at front contact d of relay 1–8ASDR and relay 1–4BSTR likewise releases. Then, with relay 1–4BSTR released, relay 1–8ASTPR releases when relay 1–8TR is again energized and picks up, opening its back contact a. The relays of the A bank of unit 1–8U are then all reset, completing the transfer of the route description from unit 1–8U to the B bank of unit 1–4U.

With relay 1–4BSTR released and relay 1–4BSDR picked up, a circuit is formed for relay 1–4ASTR to initiate the transfer of the route description to the A bank. This circuit can be traced from terminal B over back contact d of relay 1–4BSTR, front contact e of relay 1–4BSDR, back contact c of relay 1–4ASDR, and winding of relay 1–4ASTR to terminal N. When relay 1–4ASTR picks up closing its front contact a, it establishes a stick circuit for itself which bypasses back contact c of relay 1–4ASDR. When back contact b of relay 1–4ASTR is opened, one path of the stick circuit for relay 1–4BSDR is interrupted but that relay remains energized by the other path of the stick circuit completed at back contact b of relay 1–4ASDR. When front contact c of relay 1–4ASTR is closed a circuit is established for energizing relay 1–4ASDR, this circuit extending from terminal B over a cancellation contact 36, front contact c of relay 1–4ASTR, front contact b of track relay 1–4TR, and winding of relay 1–4ASDR to terminal N. The closing of front contact a of relay 1–4ASDR establishes a stick circuit for that relay which bypasses front contact c of relay 1–4ASTR.

The picking up of relay 1–4ASDR to open back contact b interrupts the stick circuit for relay 1–4BSDR and that relay is released at the end of its slow release period. Both relays 1–4ASTR and 1–4ASDR are picked up at this time and during the slow release period of relay 1–4BSDR, current is supplied to the switch storage relays (not shown) for the A bank of unit 1–4U. The associated switch 1–4 is thus controlled as required to establish the route to storage track 1, in this case the switch 1–4 being set at its normal position if it does not already occupy that position.

When relay 1–4BSDR is released opening fron contact e, the transfer relay 1–4ASTR is without current and it releases. At this time destination or detector relay 1–4ASDR is retained energized by its stick circuit previously traced.

The route description remains stored in the A bank of unit 1–4U until the car cut advances and occupies track section 1–4T shunting track relay 1–4TR. The opening of front contact b of track relay 1–4TR interrupts the circuit for relay 1–4ASDR and that relay releases. The repeater relay 1–4ASDPR now receives current from terminal B over back contact a of relay 1–4TR, back contact d of relay 1–4ASDR, and winding of relay 1–4ASDPR to terminal N. When repeater relay 1–4ASDPR picks up closing front contact a, it establishes a stick circuit which bypasses back contact d of relay 1–4ASDR.

The next step is to forward the route description to the B bank of the unit 1–2U. This step is effected in substantially the same manner as the route description for storage track 1 was forwarded from the A bank of unit 1–8U to the B bank of unit 1–4U.

It is to be noted that transfer relay 1–2BSTR of the B bank of unit 1–2U receives current from terminal B over back contact d of relay 1–4ASTR, front contact c of relay 1–4ASDPR, wire 37, back contact c of relay 1–2BSDR, and winding of relay 1–2BSTR to terminal N. With relay 1–2BSTR picked up closing its front contact a, it establishes a stick circuit which bypasses back contact c of relay 1–2BSDR.

At this time detector relay 1–2BSDR is energized by a pickup circuit which includes terminal B, back contacts c in multiple of relays 1–2ASTR and 1–2ASDR, front contact c of relay 1–2BSTR, winding of relay 1–2BSDR, and terminal N. With relay 1–2BSDR picked up closing its front contact a, it establishes a stick circuit which bypasses front contact c of relay 1–2BSTR.

At this time, relay 1–2BSTR is released due to release of relay 1–4ASDPR when the car cut vacates section 1–4T and relay 1–4TR picks up, but relay 1–2BSDR is retained energized by its stick circuit previously traced. The transfer of the route description to the A bank of unit 1–2U is now initiated by relay 1–2ASTR being supplied with current from terminal B, over back contact b of relay 1–2BSTR, front contact d of relay 1–2BSDR, back contact d of relay 1–2ASDR, and winding of relay 1–2ASTR to terminal N. Relay 1–2ASTR, on picking up closing its front contact a, establishes a stick circuit for itself which bypasses back contact d of relay 1–2ASDR. Relay 1–2ASDR is then supplied with current by a circuit including terminal B, cancellation contact 38, front contact d of relay 1–2ASTR, front contact a of track relay 1–2TR, winding of relay 1–2ASDR, and terminal N. The closing of front contact a of relay 1–2ASDR completes a stick circuit for the relay which bypasses front contact d of relay 1–2ASTR. This completes the transferring of the route description to the A bank of unit 1–2U and an associated switch storage relay (not shown) is controlled to in turn control switch 1–2 to the position required to direct the car cut to track 1.

To sum up, when a route is entered in the machine the route description is cascaded to the final or A bank of unit 1–8U for controlling the first switch 1–8, this cascading being effected by transfer relay 1–8ASTR and detector relay 1-8ASDR, the relay 1-8ASDR being retained picked up when the route description is stored. Then when the car cut enters the detector track circuit of switch 1-8, the repeater relays 1-8ASTPR and 1-8ASDPR function to transfer the route description to the B bank of the storage unit of the next switch involved, such as unit 1-4U for switch 1-4. In this unit, the route description is cascaded to the A bank where relay 1-4ASDR remains energized until the car cut advances and enters the detector track circuit of switch 1-4. At this time repeater relay 1-4ASDPR functions to forward the route description to the B bank of the storage unit for the next switch involved, such as unit 1-2U for switch 1-2. The route description is then cascaded to the A bank if that bank is empty.

I shall now describe the apparatus provided according to my present invention for transferring the car weight information from the weight determining means to weight storage relays for control of retarder 1-2RT according to the weight of the car cut being switched to classification track 1. This apparatus cooperates with the automatic switching apparatus described hereinbefore and thereby accomplishes car weight speed control for the intermediate retarders with minimum additional equipment so that an economical system is provided.

To match the number of storage banks provided for the automatic switching apparatus for all route storage units except that for the initial or hump track switch 1-8, weight information storage units having two storage banks are provided. For example, a weight storage unit associated with route storage unit 1-4U is indicated as a whole by a dotted rectangle 1-4W. This unit 1-4W is provided with a first or B bank which includes weight storage relays 1-4BRH and 1-4BRL, and end-of-cut repeater relay 1-4BRLSP; and with a second or A bank which includes weight storage relays 1-4ARH and 1-4ARL, and end-of-cut repeater relay 1-4ARLSP. Similarly, a weight storage unit 1-2W is associated with route storage unit 1-2U. This unit 1-2W includes a first or B bank having weight storage relays 1-2BRH and 1-2BRL and a second or A bank having weight storage relays 1-2ARH and 1-2ARL. The unit 1-2W is also provided with a group of weight storage information relays energizable in different arrangements and which group includes relays 1-2RH and 1-2RL.

It is to be noted that as previously explained the intermediate retarder 1-2RT may be of any one of the known constructions and is here considered as being of the electropneumatic type used at many yards and disclosed and described in detail in the aforementioned H. L. Bone Patent No. 1,927,201. Consequently, it is sufficient for this application to show the retarder 1-2RT conventionally and describe it briefly, since its specific structure is no part of my invention. The retarder 1-2RT is effective to exert different braking forces according to which of its terminals XP, 1PP, 2PP, 3PP, 4PP, or 5PP control current is applied (see FIG. 2d). The maximum air pressure to the retarder is of the order of 110 pounds per square inch. With control current applied to terminal 1PP, pressure of the range of 20 to 30 pounds per square inch is applied to the retarder operating cylinders, control current applied to terminal 2PP results in pressure of the range 35 to 45 pounds being supplied to the operating cylinders, control current applied to terminal 3PP results in pressure of 50 to 60 pounds being supplied, control current applied to terminal 4PP causes pressure of 70 to 80 pounds to be supplied, and the full pressure is supplied when current is applied to terminal 5PP. Also, control current applied at terminal XP results in the retarder being released or opened in which position it exerts no braking force.

Figure 2C:
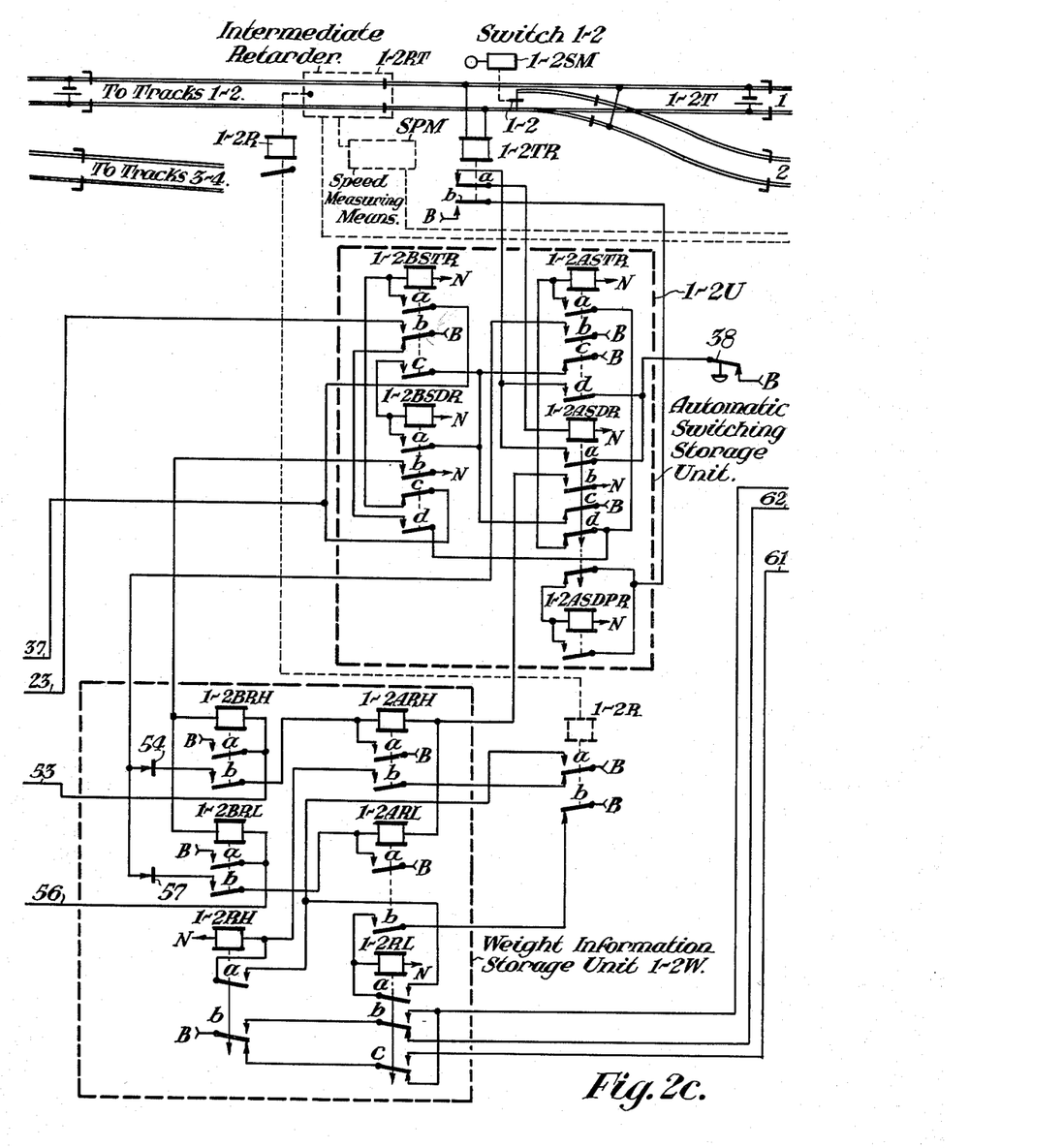
Figure 2D:
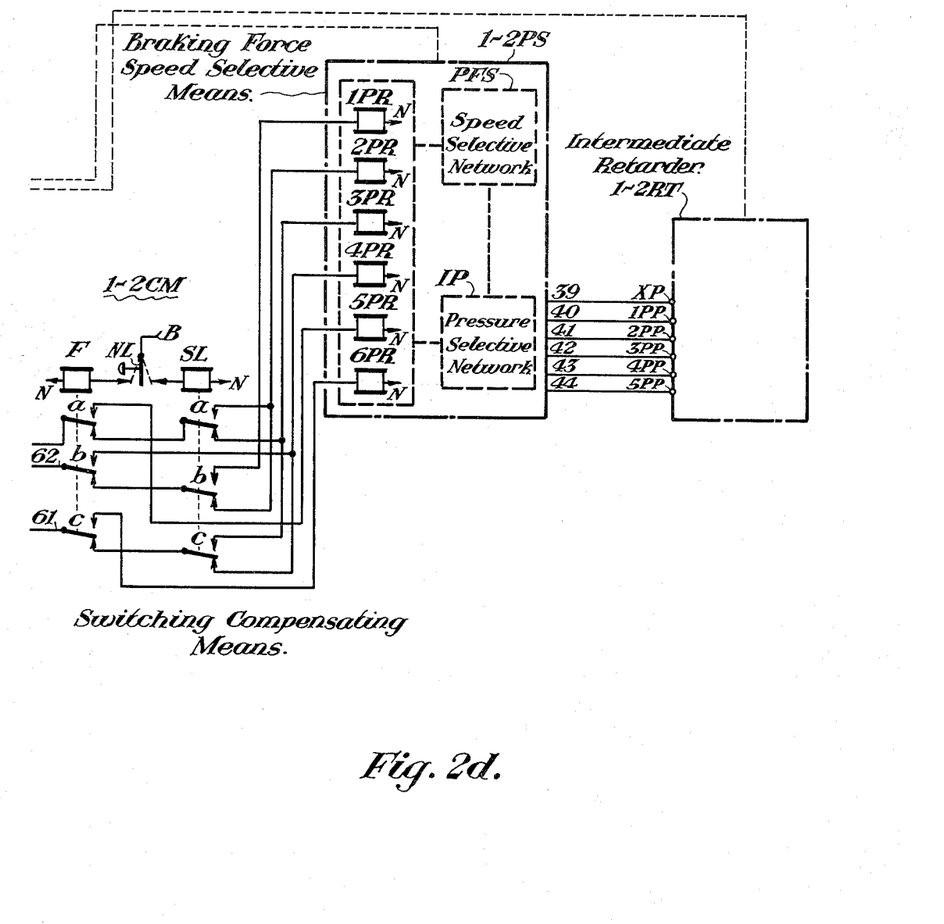

Furthermore, the retarder 1-2RT is equipped with speed measuring means SPM which is operable to repeatedly measure the speed of a car cut passing through the retarder. The speed measuring means may be of any one of different known arrangements for measuring car speed at retarders and it is also shown conventionally because its specific arrangement forms no part of my invention. Preferably this speed measuring means is similar to that disclosed and claimed in Letters Patent of the United States No. 2,751,492, issued June 19, 1956 to D. F. Fitzsimmons for Railway Car Speed Determining and Control Apparatus.

This Fitzsimmons patent and the current application are of common ownership and reference is made to the Fitzsimmons patent for a description of the car speed measuring means contemplated. It is sufficient to here explain that the speed measuring means includes a series of track circuits, an alternating current cycle repeater, and chains of counting relays. The track circuits include short insulated sections of the track rails within the retarder, track sections of the length of 3 feet 1½ inches being suitable. The track relays of the track circuits are connected to the cycle repeater to initiate a new operation of the repeater as the leading pair of car wheels enters each track section. The relay chains are connected to the repeater in such a manner as to pick up the relays one after the other in step with the cycles of the current and thereby determine, by the number of relays picked up, the time consumed by a pair of car wheels in passing through a track section, the relays being reset and newly operated for each track section. With the track section of a given length, the time consumed by the car in passing through the section is a measure of the speed of the car. This speed measuring means SPM is operable to measure a range of car speeds of the order 3 to 25 miles per hour. The speed measuring means SPM cooperates with the car weight storage means and switching compensating means for control of the braking force of intermediate retarder 1-2RT.

As here provided, the switching compensating means 1-2CM comprises a manually operable lever NL and a pair of relays F and SL. Normally lever NL is set at its mid-position, that is, the full line position as shown in the drawing, and both relays F and SL are released. This position establishes what I shall term normal switching speeds. When lever NL is set at its left-hand dotted line position, a simple circuit is closed for relay F and that relay is picked up and establishes high switching speeds for slow running conditions. With lever NL set at its right-hand dotted line position, a simple circuit for relay SL is closed and that relay is picked up and establishes low switching speeds for fast running conditions.

It has been explained that the function of a car retarder is to obtain a leaving speed, that is, the speed at which a car cut passes out the retarder, correct for the car cut to move into its final classification track and couple to cars already standing on that track. These speeds are different for car cuts of different weight groups and running conditions, the running condition being variable due to weather conditions and construction of the cars. As an aid in understanding the apparatus, I shall assume by way of illustration that under normal switching speeds or running conditions leaving speeds of 10, 8, and 6 miles per hour for light, medium, and heavy car weight groups, respectively, are desired; for fast switching speeds (slow running conditions), leaving speeds of 15, 12, and 10 miles per hour for light, medium, and heavy weight cars, respectively, are desired; and under slow switching speeds (fast running conditions), leaving speeds of 8, 6, and 4 miles per hour, respectively, are desired. It is to be understood that other leaving speeds can be selected within the limits of the apparatus.

In automatic control of retarders it becomes necessary to coordinate the weight, speed, and running condition factors for variably setting the braking force of the retarder to obtain the desired leaving speeds. To effect this coordination, each retarder is provided with a braking force speed selective means, this means for intermediate retarder 1-2RT being indicated as a whole by a dot-dash rectangle 1–2PS. Since an electropneumatic type of retarder is here used by way of illustration, this braking force speed selective means 1–2PS is preferably similar to the speed pressure selection control apparatus disclosed and claimed in Letters Patent of the United States No. 2,727,138, issued December 13, 1955 to Edward J. Agnew for Retarder Speed Pressure Selective Control Apparatus. This Agnew patent and the present application being of common ownership, reference is made to the Agnew patent for a detail description of the braking force speed selective means 1–2PS and it will be described in my present application only briefly.

Looking at selective means 1–2PS for retarder 1–2RT, it includes a series of leaving speed selector relays 1PR to 6PR, inclusive, an initial pressure and partial pressure selective network panel IP and a partial pressure release speed and full release speed selective network panel PFS. The relays 1PR to 6PR, inclusive, are of a standard type and, in accordance with the series of different leaving speeds selected above, the schedule of leaving speeds of 4, 6, 8, 10, 12, and 15 miles per hour are assigned for relays 1PR, 2PR, 3PR, 4PR, 5PR and 6PR, respectively.

The panel network IP is provided with two series of selector relay jacks, a first one of which is for initial pressure selection and the other one of which is for partial pressure selection. These jacks are provided with connections to contacts of the relays 1PR to 6PR so arranged that the leaving speeds assigned to the different relays are translated into energy applied to corresponding jacks, the jacks receiving energy being in accordance with the particular selector relay picked up. Also the panel network IP has other groups of jacks which are selectively connected to the control terminals of the retarder 1–2RT, these connections being completed over wires 39 to 44, inclusive. By use of plug connectors inserted in the jacks, energy can be applied to the terminals of retarder 1–2RT in such a manner that a designated initial pressure and partial pressure for each of the different leaving speeds can be set up in the retarder by energization of the selector relay corresponding to each particular leaving speed.

The partial pressure release speed and full release speed panel network PFS is provided with several different groups of jacks which have prearranged connections with contacts of the selector relays 1PR to 6PR and with contacts of the relay chains of the speed measuring means SPM for retarder 1–2RT. These two networks, PFS and IP, permit plug connectors to be inserted in selected jacks to obtain a partial pressure release at a selected car speed and a full release of the retarder at the leaving speed established for the car cut by the particular selector relay energized. In other words, the braking force speed selective means 1–2PS permits the setting up by plug connectors of circuits which are brought into play, in accordance with the particular relay 1PR to 6PR energized and the car speed as determined by the speed measuring means SPM, to automatically control the manner in which energy is applied to the terminals of retarder 1–2RT to obtain a leaving speed predetermined according to the weight of the car cut and the rolling condition.

I shall next describe the operation of forwarding the stored car weight information from the weight storage relays at the weighing device to weight storage information relays for the intermediate retarder 1–2RT. It is assumed that the route described for a car cut to classification track 1 has been entered in the automatic switching apparatus by operation of pushbutton 1PB of control machine CM. The initial position of all relays concerned, prior to a car cut being humped, is deenergized. Further assuming that this car cut being humped consists of a single car of the heavy weight group, the weight storage relay RH3 of the second group RL3–RH3 is energized and picked up when the car is weighed. When the leading pair of wheels of this heavy car enters the detector track section 1–8T, the route description is forwarded from the A bank of the route storage unit 1–8U to the B bank and then to the A bank of the unit 1–4U in the manner previously explained in connection with the automatic switching apparatus. That is, relay 1–4BSDR is temporarily energized and then released when the route description is transferred to the A bank of unit 1–4U, relay 1–4ASDR being retained energized. With the car cut at this position, the end-of-cut relay RLSP is retained energized since the rear wheels of the car are in retarder section RT3 and relay R3 is picked up. Thus, relay RH3 is retained energized and free of any control by the weighing device WD. Under these circumstances, when the route description is transferred to the B bank of unit 1–4U, relay 1–4BRH of unit 1–4W is supplied with current, the circuit being traced from terminal B over front contact c of relay RH3, wire 45, back contact c of relay 1–4BRLSP, rectifier element 46 in its forward direction, winding of relay 1–4BRH, and front contact d of relay 1–4BSDR to terminal N. Relay 1–4BRH on picking up completes a stick circuit for itself at its front contact a and is retained energized until relay 1–4BSDR is released.

When the route description is transferred from the B bank to the A bank of the unit 1–4U and relays 1–4ASTR and 1–4ASDR are picked up, relay 1–4ARH is energized by current flowing from terminal B over front contact c of relay RH3, wire 45, back contact c of relay 1–4BRLSP, rectifier element 47 in its forward direction, back contact c of relay 1–4ARLSP, winding of relay 1–4ARH, and front contact e of relay 1–4ASDR to terminal N. Relay 1–4ARH on picking up completes a stick circuit at its front contact a which includes front contact e of relay 1–4ASDR. That is, for this heavy car, relays 1–4BRH and 1–4ARH are picked up in succession. Relay 1–4BRH then releases when the route description is transferred to the A bank of unit 1–4U because both the pickup and stick circuits of that relay are opened at front contact d of relay 1–4BSDR which releases a short time after relay 1–4ASDR picks up. The weight information now resides in the A bank of unit 1–4W by reason of relay 1–4ARH being picked up. As soon as the route description is stored at relay 1–4ASDR, repeater relay 1–4ARLSP of the A bank of unit 1–4W receives current from terminal B over front contact d of relay RLSP, wire 48, back contact b of relay 1–4BRLSP, winding relay 1–4ARLSP, and front contact e of relay 1–4ASDR to terminal N. A stick circuit is established at front contact a of relay 1–4ARLSP when the relay picks up. Opening of back contacts c and d of relay 1–4ARLSP interrupts the pickup circuits of relays 1–4ARH and 1–4ARL to prevent any modification of the weight information stored in the A bank. Such modification might otherwise occur when this single car cut clears the retarder, releasing relay RLSP to allow relays RL3 and RH3 to return to the control of weighing device WD, which may have already recorded the weight of a closely following cut. If relay 1–4ARLSP is energized at the same time as relay 1–4ARH, the energization of the latter relay will be completed over front contacts of relay 1–4ASTR and 1–4BRH, as will be explained fully hereinafter. Thus heavy weight car information is stored in the A bank of unit 1–4W by relays 1–4ARH and 1–4ARLSP being energized.

As explained in the Falkowski patent, in the event the car is of medium weight group or if the cut consists of more than one car of which one or more cars back of the leading car are not of the heavy weight group, relay RL3 of the storage group RL3–RH3 is picked up along with the relay RH3. In this case relay 1–4BRL also receives energy from terminal B over front contact d of relay RL3, wire 49, back contact d of relay 1–4BRLSP, rectifier element 50 in its forward direction, winding of relay 1–4BRL, and front contact d of relay 1–4BSDR to terminal N. Then, when the route description is transferred to the A bank of unit 1–4U and relay 1–4ASDR is energized, the 1–4ARL relay is supplied with current by a circuit extending as just traced to back contact d of relay 1–4BRLSP, and thence over rectifier element 51 in its forward direction, back contact d of relay 1–4ARLSP, winding of relay 1–4ARL, and front contact e of relay 1–4ASDR to terminal N. Relay 1–4ARL on picking up closing its front contact a establishes a stick circuit similar to that for relay 1–4ARH. Under this condition both relays 1–4ARH and 1–4ARL along with relay 1–4ARLSP are energized to store medium weight information in the A bank of unit 1–4W. Obviously, if the car is of light weight and relay RL3 only is picked up, the relays 1–4ARL and 1–4ARLSP of unit 1–4W are picked up when the weight information is forwarded to unit 1–4W.

In the event the cut of cars includes a number of cars so that the leading pair of wheels occupies track section 1–8T prior to the time the entire cut has passed over the weighing device in section AT, it is to be noted that the car weight transferred to and stored in the A bank of unit 1–4W can continue to be modified. For example, if the weight information initially transferred places the cut in the heavy weight group, the presence of a light weight car passing the weighing device will change this stored information to the medium weight group, that is, both relays 1–4ARH and 1–4ARL picked up. This modification can continue, if necessary, until the leading wheels of the cut enter track section 1–4T to cause the route description and the weight information, as will be explained shortly, to be transferred to the units at the next switch location. Until the end-of-cut relay RLS and its repeater RLSP pickup, which does not occur until the cut has cleared the initial section RT1 of the master retarder, relay 1–4ARLSP is not energized. Thus the control circuits for relays 1–4ARH and 1–4ARL, over front contacts of relays RH3 and RL3, respectively, remain effective, since back contacts c and d of relay 1–4ARLSP remain closed, and the stored weight information can be modified. If the weight information is stored in the B bank, with the weight information for a preceding cut stored in bank A and relay 1–4ARLSP held up, relay 1–4BRLSP will remain down, and the control of relays 1–4BRH and 1–4BRL over front contacts of relays RH3 and RL3, respectively, remains in effect. This feature is important in the proper retardation of long cuts in providing a more realistic weight grouping in accordance with the measured weights of more of the cars included in the cut. Since the modification must, in any case, halt when the route description and weight information are transferred from the units 1–4U and 1–4W to the next location, the distance between track sections AT and 1–4T is the controlling factor as to how many car weights can be measured and used during the modification period.

When the car cut has advanced so that its leading pair of wheels enters detector track section 1–4T, shunting track relay 1–4TR, the automatic switching apparatus functions to forward the route description from the A bank of unit 1–4U to the B bank of unit 1–2U and then into the A bank of unit 1–2U in the manner previously described. During the forwarding of the route description from unit 1–4U to unit 1–2U for switch 1–2, the weight information stored in unit 1–4W is advanced to the weight storage unit 1–2W. Assuming that the car cut is of the heavy weight group so that the weight information is stored at relay 1–4ARH of unit 1–4W, when both relays 1–2BSTR and 1–2BSDR are energized, current is supplied to relay 1–2BRH by a circuit which can be traced from terminal B over front contact b of relay 1–2BSTR, wire 23, rectifier element 52 in its forward direction, front contact b of relay 1–4ARH, wire 53, winding of relay 1–2BRH, and front contact b of relay 1–2BSDR to terminal N. Relay 1–2BRH on picking up to close its front contact a establishes a stick circuit which retains the relay energized as long as relay 1–2BSDR is picked up.

In the case light car weight information is stored at relay 1–4ARL, this weight information is forward to relay 1–2BRL when the route description is forward to unit 1–2U. This time a circuit is completed from terminal B over front contact b of relay 1–2BSTR, wire 23, rectifier element 55, front contact b of relay 1–4ARL, wire 56, winding of relay 1–2BRL, and front contact b of relay 1–2BSDR to terminal N. Relay 1–2BRL on picking up establishes a stick circuit at its front contact a to retain the relay energized with the route storage relay 1–2BSDR picked up. Obviously for a medium car weight stored by both relays 1–4ARH and 1–4ARL of unit 1–4W being energized, this medium weight information is forwarded to unit 1–2W to energize both relays 1–2BRH and 1–2BRL of the B bank of unit 1–2W.

When the route description cascades to the A bank of unit 1–2U, the car weight information stored in the B bank of unit 1–2W is cascaded to its A bank. For a heavy car weight stored by relay 1–2BRH being picked up, relay 1–2ARH is provided with a pickup circuit traced from terminal B over front contact b of relay 1–2ASTR, rectifier element 54 in its forward direction, front contact b of relay 1–2BRH, winding of relay 1–2ARH, and front contact b of relay 1–2ASDR to terminal N. Relay 1–2ARH on picking up to close its front contact a establishes a stick circuit by which it is retained energized as long as the route description is stored in the A bank of unit 1–2U and relay 1–2ASDR is energized. If light weight car information is stored at the B bank of unit 1–2W, then relay 1–2ARL is provided with a pickup circuit extending from terminal B over front contact b of relay 1–2ASTR, rectifier element 57 in its forward direction, front contact b of relay 1–2BRL, winding of relay 1–2ARL, and front contact b of relay 1–2ASDR to terminal N. Relay 1–2ARL establishes a stick circuit when it picks up to close its front contact a. It is clear that medium car weight information stored by both relays 1–2BRH and 1–2BRL being energized is transferred to relays 1–2ARH and 1–2ARL, both relays being picked up.

As previously stated, the unit 1–2W is provided with a group of two weight information storage relays, 1–2RH and 1–2RL, which are energized in different combinations for the different car weight groups, this arrangement being the same as used for storage relay group RH3 and RL3. That is, relay 1–2RL only is energized for light car weight, both relays 1–2RL and 1–2RH are energized for medium car weight, and relay 1–2RH alone is energized for heavy car weight. Also, these weight storage relays are controlled by occupancy relay 1–2R which becomes energized and picks up when a car cut enters retarder 1–2RT and remains energized as long as any pair of wheels of the cut occupies the retarder.

Thus relay 1–2RL is supplied with energy over back contact b of occupancy relay 1–2R, front contact b of relay 1–2ARL, and the winding of relay 1–2RL, and is retained energized by a stick circuit including its own front contact a and front contact a of relay 1–2R. Similarly, relay 1–2RH is provided with pickup circuit which includes back contact a of relay 1–2R and front contact b of relay 1–2ARH, and with a stick circuit including its own front contact a and front contact a of relay 1–2R. Both relays 1–2RH and 1–2RL are provided with slow release periods to retain them picked up during the contact transfer time of relay 1–2R. As will be explained shortly, relays 1–2RH and 1–2RL are used to cooperate with the speed measuring means SPM and the switching compensating means 1–2CM in selecting circuit arrangements of the braking force speed selective means 1–2PS to in turn control retarder 1–2RT to obtain leaving speeds for the retarder which are preselected different for the different car weight groups.

Referring again to the operation of storing heavy car weight information at relay 1–4ARH of unit 1–4W in response to a car cut of the heavy weight group and assuming that after this car cut has vacated track section 1-3T but has not yet reached switch 1-4, a second car cut, say of the light weight group, is weighed and its weight information is stored at relay RL3. Assuming further that this second car cut has advanced to track section 1-3T before the leading car cut enters section 1-4T, the route description for the second cut, which may be classification track 2, is forwarded by the automatic switching apparatus to the B bank of unit 1-4U.

At the same time the weight information of the second car cut is forwarded from relay RL3 to the B bank of unit 1-4W, relay 1-4 BRL being energized over its previously traced pickup circuit and retained energized by its stick circuit. That is, at this time, the weight information for the first car cut is stored in the A bank of unit 1-4W and the weight information for the second car cut is stored in the B bank of unit 1-4W.

Assuming that the second cut is short and passes out of retarder section RT3 releasing end-of-cut relay RLSP before the route storage of the first cut is cleared out of the A bank of unit 1-4U, the repeater relay 1-4BRLSP of unit 1-4W is energized before relay RLSP releases since relay 1-4ARLSP is picked up while weight information is stored in the A bank of unit 1-4W. This pickup circuit for relay 1-4BRLSP extends from terminal B over front contact $c$ of relay RLSP, wire 58, front contact $b$ of relay 1-4ARLSP, front contact $c$ of relay 1-4BRL, winding of relay 1-4BRLSP, and front contact $d$ of relay 1-4BSDR to terminal N. Relay 1-4BRLSP on picking up establishes at its front contact $a$ a stick circuit by which it is retained energized after relay RLSP is released.

Assuming next that the leading car cut enters track section 1-4T, its route description is cleared out of the A bank of unit 1-4U and at the same time the weight information of the leading car cut is forwarded from the A bank of unit 1-4W in the manner previously explained. The weight information for the second car cut is then cascaded from the B bank to the A bank of unit 1-4W. At this time, current is supplied from terminal B over front contact $d$ of relay 1-4ASTR, rectifier element 59 in its forward direction, front contact $b$ of relay 1-4BRL, the second cut assumed as being of the light weight group, winding of relay 1-4ARL, and front contact $e$ of relay 1-4ASDR to terminal N. Relay 1-4ARL when picked up establishes a stick circuit at its front contact $a$ to retain the relay energized with the route description of the second cut stored at the A bank of unit 1-4U. Since relay 1-4BRLSP is picked up at this time, the relay 1-4ARLSP is supplied with current over front contact $d$ of relay 1-4ASTR, rectifier element 60, front contact $b$ of relay 1-4BRLSP, winding of relay 1-4ARLSP, and front contact $e$ of relay 1-4ASDR. Hence the weight information for the second cut stored in the B bank of unit 1-4W is cascaded to the A bank of the unit and the B bank is released ready to receive weight information of a third cut.

The manner in which the weight storage relays 1-2RH and 1-2RL are used to control retarder 1-2RT will now be described. Previously, a schedule of leaving speeds of 10, 8, and 6 miles per hour for normal switching speeds; 15, 12, and 10 miles per hour for high switching speeds; and 8, 6, and 4 miles per hour for low switching speeds has been assumed for light, medium, and heavy cars, respectively. The speed selector relays 1PR to 6PR, inclusive, have been assigned leaving speeds of 4, 6, 8, 10, 12, and 15 miles per hour, respectively. Therefore, it follows that relays 4PR, 3PR, and 2PR should be selected for light, medium, and heavy cars under normal running conditions; relays 6PR, 5PR and 4PR selected for light, medium, and heavy cars under slow running conditions; and relays 3PR, 2PR and 1PR selected for light, medium, and heavy cars under fast running conditions.

Hence for a light weight car under control conditions, relay 4PR is provided with a circuit that includes terminal B, back contact $b$ of relay 1-2RH, front contact $c$ of relay 1-2RL, wire 61, back contacts $c$ of relays F and SL, respectively, winding of relay 4PR, and terminal N. Relay 4PR of means 1-2PS in cooperation with speed measuring means SPM selects circuit arrangements previously prepared by plug connectors in the networks of means 1-2PS that apply energy to the terminals of retarders 1-2RT in such a manner that the initial braking force, partial braking force, and full release are effected to obtain the desired car leaving speed of 10 miles per hour at the retarder 1-2RT. Under slow running conditions with relay F picked up, the relay 6PR is provided with a circuit for a light weight car to obtain a leaving speed of 15 miles per hour. This circuit includes back contact $b$ of relay 1-2RH, front contact $c$ of relay 1-2RL, wire 61, front contact $c$ of relay F, and winding of relay 6PR. Relay 6PR when energized cooperates with the speed measuring means in rendering effective previously selected circuit arrangements of the networks of means 1-2PS by which current is supplied to the terminals of retarders 1-2RT in such a manner that the braking forces exerted obtained in a leaving speed of 15 miles per hour. Under fast running conditions with relay SL picked up, a circuit is formed for relay 3PR when light weight information is stored at relay 1-2RL, the circuit being completed over back contact $b$ of relay 1-2RH, front contact $c$ of relay 1-2RL, wire 61, back contact $c$ of relay F, and front contact $c$ of relay SL. Relay 3PR when energized cooperates with the speed measuring means in selecting circuits in the networks of means 1-2PS which supply current to the retarder in such a manner that a leaving speed of 8 miles per hour is obtained.

Similarly, when heavy car weight information is stored at relay 1-2RH and normal conditions prevail, the relay 2PR is energized to cooperate with the speed measuring means in selecting circuits in the networks to obtain a leaving speed of 6 miles per hour, the circuit for relay 2PR including front contact $b$ of relay 1-2RH, back contact $b$ of relay 1-2RL, wire 62, back contacts $b$ of relays F and SL, and winding of relay 2PR. When using high switching speeds for a heavy weight car, the relay 4PR is energized and cooperates with the speed measuring means in selecting circuits of the networks to obtain a leaving speed of 10 miles per hour. This circuit for relay 4PR includes front contact $b$ of relay 1-2RH, back contact $b$ of relay 1-2RL, wire 62, and front contact $b$ of relay F. With low switching speeds in use and a heavy car, the relay 1PR is used to cooperate with the speed measuring means to obtain a leaving speed of 4 miles per hour, the circuit for relay 1PR including front contact $b$ of relay 1-2RH, back contact $b$ of relay 1-2RL, wire 62, back contact $b$ of relay F and front contact $b$ of relay SL.

When medium car weight information is stored by both relays 1-2RH and 1-2RL being picked up, a circuit is formed for relay 3PR of the selective means 1-2PS under normal conditions, for relay 5PR under slow conditions, and for relay 2PR under fast conditions, as will be apparent from an inspection of FIGS. 2c and 2d. These relays 3PR, 5PR, and 2PR cooperate with the speed measuring means to select circuits of the networks of means 1-2PS to obtain leaving speeds 8, 12, and 6 miles per hour, respectively.

It is to be noted that under standby conditions, that is, when no weight is stored and both relays 1-2RH and 1-2RL are released, circuits are formed for relays 3PR, 5PR, and 2PR under normal, slow, and fast running conditions and the retarder is set at the corresponding initial braking force under the standby conditions.

Each of the other intermediate retarders 3-4RT, 5-6RT, and 7-8RT is provided with a car weight storage unit similar to the unit 1-2W provided for intermediate retarder 1-2RT, and each of these other units will be controlled by the initial weight storage relays through the automatic switching apparatus in substantially the same manner that unit 1–2W is controlled. Furthermore, each of these other car weight storage units will have a car weight storage relay group, similar to relays 1–2RH and 1–2RL, which cooperates with speed measuring means and compensating switching means to select previously prepared circuit arrangements of an associated braking force speed selective means to apply control current to the corresponding retarder and obtain leaving speeds selected for the different car weights.

Again it is clear that group retarders that may be located between these intermediate retarder and the final classification tracks at large yards can be provided with car weight information storage units similar to unit 1–2W.

It is also to be noted that the switching compensating means 1–2CM can take other forms operable to different positions according to rolling conditions of car cuts or it can be omitted and the selector relays of the braking force speed selective means controlled direct by the weight storage relays.

It follows from the foregoing description that the apparatus provided according to my invention has the advantages that intermediate and group retarders of a gravity-type classification yard are automatically controlled according to the weight of the car cuts with only a little additional equipment required so that an economical system is afforded.

Although I have herein shown and described but one form of railway car retarder speed control apparatus embodying my invention, it is to be understood that various changes and modifications may be made therein within the scope of the appended claims without departing from the spirit and scope of my invention.

Having thus described my invention, what I claim is:

1. In a railway gravity-type yard having a hump track which diverges through track switches to several classification tracks and which yard is provided with car retarders located at least one in each track leading from the hump track to a classification track, each retarder being operable to exert different braking forces according to the manner current is applied thereto, the yard being also provided with automatic switching apparatus having a control device for each storage track and route storage relay units one for each track switch location, the switching apparatus being operable to store the route description from the hump track to any classification track whose control device is operated and to forward the route description from one route storage unit to the next successive unit through transfer and destination relays of the unit as a car cut moves toward the designated classification track, the combinations comprising, a car weight determining means including a weighing device and an initial weight storage relay group, said weighing device having an element mounted in the hump track and operable to different positions to classify car cuts into a plurality of different weight groups, said initial weight storage relay group energizable in a different combination for each said car weight group and having connections to said weighing device to store the weight group of a car by the combinations at which the relay group is energized, other weight storage relay groups one for each of the car retarders, each said other relay group energizable in a different combination for each of said car weight groups, each said other weight storage relay groups having connections to the associated retarder to control its braking force according to the energized combination of the relay group, weight storage units one for each route storage unit of the yard except that for the first track switch location, each said weight storage unit including relays energizable in a different arrangement for each said car weight group, and special circuit means including contacts of said initial weight storage relay group and contacts of the transfer and destination relays of the route storage units with connections to the weight storage units to forward the car weight group stored in the initial weight storage relay group to the said other weight storage relay group for the retarder through which a car cut passes in its route to its designated classification track.

2. In a railway gravity-type yard having a hump track which diverges through track switches to several classification tracks and which yard is provided with car retarders located at least one in each track leading from the hump track to a classification track, each retarder being operable to exert different braking forces according to the manner current is applied thereto, the yard being also provided with automatic switching apparatus having a control device for each classification track and route storage relay units one for each track switch location, the switching apparatus being operable to store the route description from the hump track to any classification track whose control device is operated and to forward the route description from one route storage unit to the next successive unit through transfer and destination relays of the unit as a car cut moves toward the designated classification track, the combination comprising, a car weight determining means including a weighing device and an initial weight storage relay group, said weighing device having an element mounted in the hump track and operable to different positions to classify car cuts into a plurality of different weight groups, said initial weight storage relay group energizable in a different combination for each said car weight group and having connections to said weighing device to store the weight group of a car by the combination at which the relay group is energized, other weight storage relay groups one for each of the car retarders and each said other relay group energizable in a different combination for each said car weight group, each said other weight storage relay group having connections to the associated retarder to control its braking force according to the energized combination of the relay group, weight storage units one for each route storage unit of the yard except the route storage unit for the first track switch location, each said weight storage units including a first and a second relay bank the relays of each of which banks are energizable in a different arrangement for each of said car weight groups, circuit means including contacts of said initial weight storage relay group and contacts controlled by a car cut occupying the hump track to forward the car weight stored in the initial weight storage relay group to the first bank of the weight storage unit for the route storage unit for the next successive track switch of a route, other circuit means for each said weight storage unit including contacts of the transfer and destination relays of the associated route storage unit with connections with relays of said banks to cascade the car weight group stored in the first bank to the second bank of the weight storage unit, and still other circuit means including contacts of the transfer and destination relays of the route storage units to forward the car weight stored in the second banks of the weight storage units to the weight storage relay group of the retarder through which a car cut passes in its route to a classification track in step with the forwarding of the route description through the successive route storage units.

3. In a railway classification yard having a hump track which diverges through track switches to several classification tracks and in which yard the speed of car cuts moving from the hump track to the classification tracks is governed by a master car retarder located in the hump track and intermediate retarders located at selected points in the tracks leading from the hump track to the classification tracks, each retarder being operable to exert different braking forces according to the manner in which current is applied thereto, said yard being also provided with automatic switching apparatus having a control device for each classification track and route storage relay units one for each track switch location, said switching apparatus being operable to store the route description from the hump track to any classification track whose control device is operated and to forward the route description from one route storage unit to the next successive unit through transfer and destination relays of the unit as a car cut moves toward the designated classification track, said yard being further provided with car weight determining means with connections to said master retarder for control of that retarder according to the weight of a car cut passing through, said weight determining means including a weighing device located in the approach to said master retarder and operable to classify car cuts into a plurality of different weight groups, said weight determining means also including an initial weight storage relay group energizable in different combinations according to the weight group of a car cut as determined by said weighing device, the relay combination energized being variable as said weighing device records different weight groups of a multiple car cut, an end-of-cut relay fixing the final combination stored when the final car of said car cut has passed a pre-selected distance beyond said weighing device; the combination comprising, other weight storage relay groups one for each of said intermediate retarders, each said other weight storage relay group energizable in different combinations according to the weight group of a car cut, each said other weight storage relay group having connections to the associated retarder to control its braking force according to the energized combination of that relay group, weight storage units one for each route storage unit of said yard except the route storage unit for the first track switch location which is common to all routes, each said weight storage unit including a first and a second relay bank the relays of each bank being energizable in a different combination for each of said car weight groups, special circuit means within each said weight storage unit including contacts of the transfer and destination relays of the associated route storage unit to cascade a car weight group stored in the first bank to the second bank, a first circuit means including contacts of said initial weight storage relay group and contacts controlled by a car cut occupying the hump track to forward the car weight group for that car cut stored in the initial weight storage relay group to the first bank of the initial weight storage unit for a route associated with the route storage unit for the next switch in the route for that car cut beyond the first common track switch, a second circuit means including contacts opened in response to the energization of said end-of-cut relay to allow the energized combination of the relays of said first and said second banks of said control weight storage unit for a route to be varied prior to the transfer of the weight group to the succeeding weight storage unit of that route according as the energized combination in said control weight storage relay group is varied, and other circuit means including contacts of said initial weight storage unit and contacts of succeeding route storage units and weight storage units to forward the car weight group stored in said second bank of said control weight storage unit to the weight storage relay group of the retarder which a car cut passes in its route to a classification track in step with the forwarding of the route description.

References Cited by the Examiner
UNITED STATES PATENTS

| | | | |
|---|---|---|---|
| 1,626,920 | 5/27 | Coleman | 104—26 X |
| 1,766,539 | 6/30 | Prescott | 104—26 X |
| 2,139,324 | 12/38 | Abeloos | 104—26 |
| 2,184,544 | 12/39 | Brooks | 104—26 X |
| 2,206,550 | 7/40 | Mordin | 246—2 X |
| 2,216,610 | 10/40 | Culbertson | 246—2 X |
| 2,258,341 | 10/41 | Snavely | 246—5 |
| 2,646,270 | 7/53 | Thayer | 265—27 |
| 2,688,459 | 9/54 | Merrill et al. | |
| 2,700,728 | 1/55 | Brixner et al. | 246—134 |
| 2,727,138 | 12/55 | Agnew | 104—26 X |

FOREIGN PATENTS 880,182 12/42 France.

LEO QUACKENBUSH, *Primary Examiner.*

SIMON SAPERSTEIN, LEO J. LEONNIG, *Examiners.*